(12) United States Patent
Meijering et al.

(10) Patent No.: US 10,725,295 B2
(45) Date of Patent: Jul. 28, 2020

(54) MULTI-DEPTH AUGMENTED REALITY DISPLAY

(71) Applicants: JAGUAR LAND ROVER LIMITED, Coventry, Warwickshire (GB); CAMBRIDGE ENTERPRISE LIMITED, Cambridge (GB)

(72) Inventors: Valerian Meijering, Coventry (GB); Robert Hardy, Coventry (GB); Ali Yöntem, Cambridge (GB); Kun Li, Cambridge (GB); Daping Chu, Cambridge (GB)

(73) Assignees: Jaguar Land Rover Limited, Coventry (GB); Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 16/465,092

(22) PCT Filed: Nov. 30, 2017

(86) PCT No.: PCT/EP2017/080933
§ 371 (c)(1),
(2) Date: May 29, 2019

(87) PCT Pub. No.: WO2018/100040
PCT Pub. Date: Jun. 7, 2018

(65) Prior Publication Data
US 2019/0317324 A1     Oct. 17, 2019

(30) Foreign Application Priority Data
Nov. 30, 2016    (GB) .................................. 1620341.6

(51) Int. Cl.
G03B 21/20     (2006.01)
G02B 27/01     (2006.01)
(Continued)

(52) U.S. Cl.
CPC .......... *G02B 27/0101* (2013.01); *B60K 35/00* (2013.01); *G02B 27/145* (2013.01);
(Continued)

(58) Field of Classification Search
CPC .. G02B 27/01; G02B 27/017; G02B 27/0101; G02B 27/0172; G02B 27/4205;
(Continued)

(56) References Cited

U.S. PATENT DOCUMENTS

2001/0013960 A1    8/2001    Popovich et al.
2004/0085643 A1    5/2004    Ishikawa et al.
(Continued)

FOREIGN PATENT DOCUMENTS

EP    2 865 555 A1    4/2015
EP    2 960 095 A1    12/2015
(Continued)

OTHER PUBLICATIONS

Patents Act 1977: Combined Search and Examination Report under Sections 17 and 18(3), UKIPO Application No. GB1620338.2, dated May 30, 2017, 6 pp.
(Continued)

*Primary Examiner* — Sultan Chowdhury
(74) *Attorney, Agent, or Firm* — Miller Nash Graham & Dunn LLP

(57) ABSTRACT

An imaging system for generating multi-depth virtual images on a display screen includes an image realisation device for forming a source image, and projection optics for rendering a display image on the display screen. The display image is a virtual image corresponding to the source image. The image realisation device includes an image realisation surface having a first and second region, and the image receiving surface and the projection optics are arranged such that a first point in the first region of the image receiving
(Continued)

surface and a second point in the second region of the image receiving surface are at a different distance from a focal point of the projection optics. A plurality of surfaces are arranged to direct light from the image realisation surface towards the projection optics.

20 Claims, 9 Drawing Sheets

(51) Int. Cl.
*B60K 35/00* (2006.01)
*G02B 27/14* (2006.01)
*G02B 30/52* (2020.01)

(52) U.S. Cl.
CPC ........... *G02B 30/52* (2020.01); *G03B 21/208* (2013.01); *B60K 2370/1529* (2019.05); *B60K 2370/1531* (2019.05); *B60K 2370/23* (2019.05); *B60K 2370/31* (2019.05); *B60K 2370/334* (2019.05); *G02B 2027/0127* (2013.01)

(58) Field of Classification Search
CPC .... G02B 27/4272; G02B 30/26; G02B 30/50; G02B 30/52; G02B 30/56
See application file for complete search history.

(56) References Cited

U.S. PATENT DOCUMENTS

| | | | |
|---|---|---|---|
| 2005/0179868 A1 | 8/2005 | Seo et al. | |
| 2008/0018641 A1 | 1/2008 | Sprague et al. | |
| 2008/0265150 A1 | 10/2008 | Holmes | |
| 2010/0157430 A1* | 6/2010 | Hotta | G02B 27/01 359/630 |
| 2013/0242404 A1 | 9/2013 | Kobayashi | |
| 2014/0036374 A1 | 2/2014 | Lescure et al. | |
| 2015/0061976 A1 | 3/2015 | Ferri | |
| 2016/0124295 A1 | 5/2016 | Montgomery | |
| 2016/0147074 A1* | 5/2016 | Kobayashi | G02B 3/0006 345/7 |
| 2016/0187666 A1 | 6/2016 | Manns et al. | |
| 2016/0209647 A1 | 7/2016 | Fürsich | |
| 2016/0260258 A1 | 9/2016 | Lo et al. | |
| 2016/0277725 A1 | 9/2016 | Ellsworth et al. | |

FOREIGN PATENT DOCUMENTS

| | | |
|---|---|---|
| WO | WO 2006/061959 A1 | 6/2006 |
| WO | WO 2015/019567 A1 | 2/2015 |
| WO | WO 2015/134738 A1 | 9/2015 |
| WO | WO 2015/173556 A1 | 11/2015 |
| WO | WO 2015/184409 A1 | 12/2015 |
| WO | WO 2016/027706 A1 | 2/2016 |
| WO | WO 2016/052186 A1 | 4/2016 |
| WO | WO 2016/105521 A1 | 6/2016 |

OTHER PUBLICATIONS

International Search Report and Written Opinion of the International Searching Authority, International Application No. PCT/EP2017/080870, dated May 28, 2018, 22 pp.
Patents Act 1977: Combined Search and Examination Report under Sections 17 and 18(3), UKIPO Application No. GB1620340.8, dated May 30, 2017, 6 pp.
International Search Report and Written Opinion of the International Searching Authority, International Application No. PCT/EP2017/080873, dated Apr. 5, 2018, 16 pp.
Patents Act 1977: Combined Search and Examination Report under Sections 17 and 18(3), UKIPO Application No. GB1620341.6, dated May 12, 2017, 5 pp.
International Search Report and Written Opinion of the International Searching Authority, International Application No. PCT/EP2017/080933, dated Mar. 13, 2018, 16 pp.
Patents Act 1977: Combined Search and Examination Report under Sections 17 and 18(3), UKIPO Application No. GB1620342.4, dated May 15, 2017, 5 pp.
International Search Report and Written Opinion of the International Searching Authority, International Application No. PCT/EP2017/080872, dated Feb. 5, 2018, 14 pp.

* cited by examiner

MULTI-DEPTH AUGMENTED REALITY DISPLAY

RELATED APPLICATIONS

This application is a 35 U.S.C. § 371 national stage application of PCT Application No. PCT/EP2017/080933, filed on Nov. 30, 2017, which claims priority from Great Britain Patent Application No. 1620341.6, filed on Nov. 30, 2016, the contents of which are incorporated herein by reference in their entireties. The above-referenced PCT International Application was published in the English language as International Publication No. WO 2018/100040 A1 on Jun. 7, 2018.

TECHNICAL FIELD

The present disclosure relates to a 3-D augmented reality display system. Particularly, but not exclusively, the disclosure relates to an apparatus for creating and projecting multi-dimensional 3-D augmented reality images onto a display, such as a windscreen, for use in a vehicle. Aspects of the invention relate to a system, a vehicle and a method.

BACKGROUND

Heads-up displays (HUDs) are known displays where images are projected onto a transparent surface, such as a windscreen. Such displays are well known in a number of different environments including in vehicles.

In automotive HUDs information regarding car conditions (speed etc.) or navigation is displayed onto the windscreen. Such displays are typically limited in size and project the image at a fixed depth to the user. Due to the limited size, the HUD may be cluttered with information that is less relevant to the user taking up real estate. Furthermore, as the image is of a fixed depth all information presented to the user is given equally prominence. This further reduces the efficiency of such displays.

A further consideration is that in vehicles there is typically limited physical space in which such systems can be installed. Typically, such systems must be incorporated into existing spaces present in a vehicle, or installed in as small a space as possible to minimise the need to remove and reinstall existing components. Furthermore, in such systems there is a cost associated with the introduction and installation.

SUMMARY OF THE INVENTION

Aspects and embodiments of the invention provide a system, a vehicle and a method as claimed in the appended claims.

According to an aspect of the invention, there is provided an imaging system for generating multi-depth virtual images on a display screen, the imaging system comprising: an image realisation device for forming a source image, projection optics for rendering a display image on the display screen, wherein the display image is a virtual image corresponding to the source image, and wherein the image realisation device comprises: an image realisation surface having a first and second region, wherein the image receiving surface and the projection optics are arranged such that a first point in the first region of the image receiving surface and a second point in the second region of the image receiving surface are at a different distance from the focal point of the projection optics; and a plurality of surfaces arranged to direct light from the image realisation surface towards the projection optics, wherein the surfaces and image realisation surface are arranged such that a first source image formed on the first region of the image realisation surface and projected through the projection optics will render the first display image on the display screen at a first apparent depth and a second source image formed on the second region and projected through the projection optics will render the second display image on the display screen at a second apparent depth.

Optionally each region of the image realisation surface is associated with one of the plurality of surfaces. This allows for multiple first images to be separately directed through the projection optics onto a desired portion of the display screen.

Optionally the image realisation surface is translatable along the optical axis of the projection optics. By providing an addition range of movement along the optical axis, the distance at which the real image is formed from the focal point of the projection optics may be more finely controlled.

Optionally the image realisation surface is rotatable/tiltable relative to the optical axis of the projection optics. Introducing a tilt into the image realisation surface allows for images formed on different parts of the surface to be at a continuous range of different distances from the focal point of the projection optics. Thus, by controllably deforming the image realisation surface, the available range and resolution of virtual image depths is increased.

Optionally the image realisation surface is capable of generating the source image. This eliminates the need for external image generation means, providing for a compact system with fewer components.

Optionally the image realisation surface comprises an electroluminescent layer. Such layers are capable of being activated by the application of current, which can be localised, modulated as desired.

Optionally the image realisation surface comprises an organic light-emitting diode. These can be used to provide a flexible, multi-colour display.

Alternatively, the imaging system further comprises a picture generation unit for generating the source image to be rendered as the display image on the display screen and projecting the source image onto the image realisation surface. The picture generation unit can account for predictable image distortion or degradation in the system and project a corrected image so as to ensure the quality of the final virtual image. Further, images generated by the picture generation unit will generally spread out with distance, the result being that images formed closer to the picture generation unit (and farther from the projection optics) will be smaller. This compensates for any magnification effect in the projection optics such that all virtual images are displayed on the display screen at a constant size, regardless of the distance at which the corresponding real images were formed on the image realisation surface.

Optionally the image realisation surface is an optical diffuser. This provides a surface on which the images from the picture generation unit can be selectively intercepted and formed.

Optionally one or more of the plurality of surfaces are mirrors. This maximises the incident light to be reflected towards the projection optics, with a minimal loss in intensity.

Optionally one or more of the plurality of surfaces are beam splitters having reflection/transmission ratios.

Optionally each beam splitter has a different reflection/transmission ratio.

Optionally the reflection/transmission ratios are such that the brightness of each second image is approximately equal.

Optionally the plurality of surfaces comprise a mirror and a first and second beam splitter, wherein the reflection/transmission ratio of the first beam splitter is 50/50 and the reflection/transmission ratio of the second beam splitter is 30/70.

Optionally each region of the image realisation surface has the same pixel density and pixel count.

Optionally the plurality of surfaces are aligned along the optical axis of the projection optics and the virtual images are overlaid on the display screen.

This arrangement allows the plurality of surfaces to be overlaid, saving room and further enabling the virtual images to occupy the same area on the display screen, increasing information density and making full use of available display real-estate. It further ensures the virtual images are of equal intensity and resolution.

Optionally the system comprises a second image realisation surface capable of generating the source image. This eliminates the need for external image generation means, providing for a compact system with fewer components.

Optionally the second image realisation surface has a first image generating state and a second passive state.

Optionally the second image realisation surface is arranged between the optical diffuser and the plurality of surfaces.

This arrangement allows the second image realisation state to be used in conjunction with the first image realisation surface, being passive when the first image realisation surface is being used.

Optionally the second image realisation surface is arranged between the picture generating unit and the optical diffuser and the optical diffuser has a first image forming state and a second passive state.

Optionally the imaging system is configured such that when the system is exposed to ambient light having an intensity below a predetermined threshold the second image realisation surface is placed in the first state and the optical diffuser is placed in the second passive state.

This arrangement allows a mode of operation in which the optical diffuser is rendered transparent so as not to interfere with the images generated by the second image realisation layer.

Optionally the imaging system further comprises a set of actively controlled optical components located between the image realisation surface and the plurality of surfaces, wherein the focal length of each optical component is controlled to affect the focus of a portion of the source image formed on the image realisation surface, so as to provide an additional range of depth of the display images projected by the projection optics.

Optionally the picture generation unit, image realisation device and projection optics are arranged along the optical path of the imaging system. This bypasses the need for any redirecting optics which would otherwise complicate the imaging system as well as increase its overall weight and size.

Optionally the picture generation unit further comprises focussing optics. This allows for addition fine tuning or any necessary redirection of the resulting virtual images on the display screen.

Optionally the picture generation unit comprises a holographic unit to produce computer generated holograms for forming on the diffuser.

Optionally the picture generation unit comprises a light field unit to produce 3-dimentional light field images for forming on the at least one image realisation surface.

The projection of 3-dimentional images through the imaging system enables such images to be displayed on the display screen with the appropriate varying depth so as to produce a convincing representation of a real object.

Optionally the imaging system further comprises an ambient light sensor configured to adjust the brightness of the displayed virtual images. This sensor provides feedback to either the picture generation unit or the image generation layer in order to increase or decrease the brightness of the real images so as to affect the brightness of the corresponding virtual image as required.

Optionally, the imaging system can be activated and deactivated automatically as well as by a human input. This enables the imaging system to self-activate when pertinent information is available, or as and when desired by a user.

Optionally, the display screen is a screen of a head-up display.

According to a further aspect of the invention, there is provided a vehicle comprising an imaging system as described in the preceding aspects.

According to another further aspect of the invention, there is provided a method for generating multi-depth virtual images on a display screen, the method comprising the steps of: rendering a display image on the display screen, via a projection optics wherein the display image is a virtual image corresponding to the source image, and wherein the image realisation device comprises: an image realisation surface having a first and second region, wherein the image receiving surface and the projection optics are arranged such that a first point in the first region of the image receiving surface and a second point in the second region of the image receiving surface are at a different distance from the focal point of the projection optics; and a plurality of surfaces arranged to direct light from the image realisation surface towards the projection optics, wherein the surfaces and image realisation surface are arranged such that a first source image formed on the first region of the image realisation surface and projected through the projection optics will render the first display image on the display screen at a first apparent depth and a second source image formed on the second region and projected through the projection optics will render the second display image on the display screen at a second apparent depth.

According to a further aspect of the invention, there is provided an imaging system for generating multi-depth virtual images on a screen of a head-up display, the imaging system comprising an image realisation device for realising a first image, projection optics for rendering a second image on the screen of the head-up display, wherein the second image is a virtual image corresponding to the first image, and wherein the image realisation device comprises an image realisation surface having a plurality of regions, wherein the image receiving surface and the projection optics are arranged such that each of the plurality of regions of the image receiving surface is at a different distance from the focal point of the projection optics and a plurality of surfaces arranged to direct light from the image realisation surface towards the projection optics, wherein the surfaces and image realisation surface are arranged such that a first image realised on one region of the image realisation surface and projected through the projection optics will render the second image on the screen of the head-up display at a first apparent depth and a first image realised on a different region and projected through the projection optics will render the second image on the screen of the head-up display at a second apparent depth.

According to a further aspect of the invention, there is provided an imaging system for generating multi-depth virtual images on a screen of a display screen, the imaging system comprising an image realisation device for realising a first image, projection optics for rendering a second image on the display screen, wherein the second image is a virtual image corresponding to the first image, and wherein the image realisation device comprises an image realisation surface having a plurality of regions, wherein the image receiving surface and the projection optics are arranged such that each of the plurality of regions of the image receiving surface is at a different distance from the focal point of the projection optics and a plurality of surfaces arranged to direct light from the image realisation surface towards the projection optics, wherein the surfaces and image realisation surface are arranged such that a first image realised on one region of the image realisation surface and projected through the projection optics will render the second image on the display screen at a first apparent depth and a first image realised on a different region and projected through the projection optics will render the second image on the display screen at a second apparent depth.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In an aspect of the invention the apparatus and the display are installed in a vehicle, such as a motor vehicle. Whilst the following description is described with reference to a HUD of a motor vehicle, the disclosure, and concepts described herein are applicable to other forms of HUD (for example those installed on other forms of vehicles), as well as displays in general.

Particularly, but not exclusively, the disclosure relates to an apparatus for creating and projecting multi-dimensional 3-D augmented reality images onto a display screen, such as a windscreen if it is installed for use in a confined environment such as a vehicle which can be operated on land (on/off road or track), under or over sea, in air or space. The examples can be, but are not limited to, cars, buses, lorries, excavators, exoskeleton suit for heavy-duty tasks, motorcycles, trains, theme park rides; submarines, ships, boats, yachts, jet-skies for see vehicles; planes, gliders for air crafts, spaceships, shuttles for space crafts. Furthermore, the technology can be installed/integrated in a mobile platform such as a driver's/operator's head/eye protection apparatus such as a helmet or goggles. Therefore, any activity, which involves wearing protective helmets/goggles, can benefit from this technology. These can be worn by, but are not limited to, motorcyclist/cyclist, skiers, astronauts, exoskeleton operators, military personnel, miners, scuba divers, construction workers. Moreover, it can be used in a stand-alone environment for game consoles, arcade machines and with a combination of an external 2D/3D display it can be used as a simulation platform. Also, it can be used in institutions and museums for educational and entertainment purposes.

Figure 1:
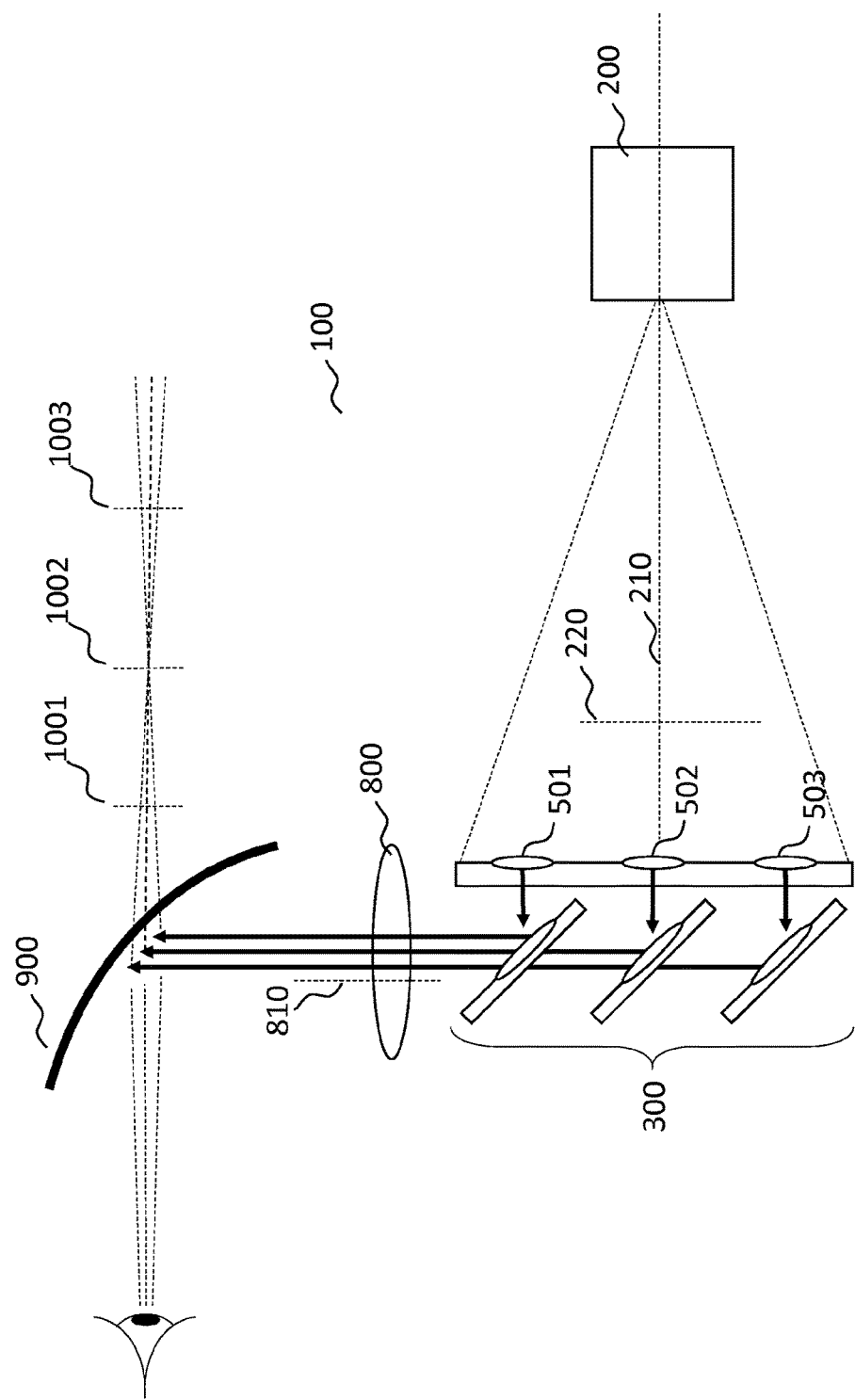
FIG. 1 is a schematic illustration of the apparatus according to an aspect of the invention.

FIG. 1 is a schematic representation of the apparatus in an aspect of the invention.

FIG. 1 is described with reference to the apparatus being installed in a motor vehicle. The skilled person would understand that the invention is applicable in other types of environments where a HUD is required and not just motor vehicles.

In FIG. 1 there is shown a schematic representation of the apparatus according to a first embodiment.

FIG. 1 shows an imaging system 100 made up of a picture generation unit 200 having a projection axis 210. The picture generation unit 200 projects light onto the image realisation device 300. The the source images, for example, real images 501-503 are formed on different portions of the image realisation device 300 are directed through projection optics 800 having optical axis 810 onto a screen 900 of a head-up display to form display images.

The form and functionality of the image realisation device 300 are described in further detail below with reference to FIGS. 2 to 6.

The path of the light from the picture generation unit 200, through the image realisation device 300 and the projection optics 800 and onto the screen 900 of the head-up display is referred to as the optical path. The skilled person would understand that any number of intervening reflectors/lens or other optical components may be placed along the optical path between the picture generation unit 200, the image realisation device 300 and the projection optics 800, to manipulate the optical path as necessary (for example, to minimize the overall size of the imaging system 100).

In use, the real images 501-503 are formed on different, spatially separate portions, of the image realisation device 300, each of portions are at different distances from the focal point of the projection optics 800. As the real images 501-503 are formed at different distances from the focal point this results in a virtual image 1001-1003 having a different focus (or perceived depth) visible on the screen 900 of the head-up display.

Accordingly, the apparatus, due to the tilted extended surface allows for virtual images to be generated at the HUD at a desired depth by forming the image at different portions of the image realisation device 300.

Figure 2:
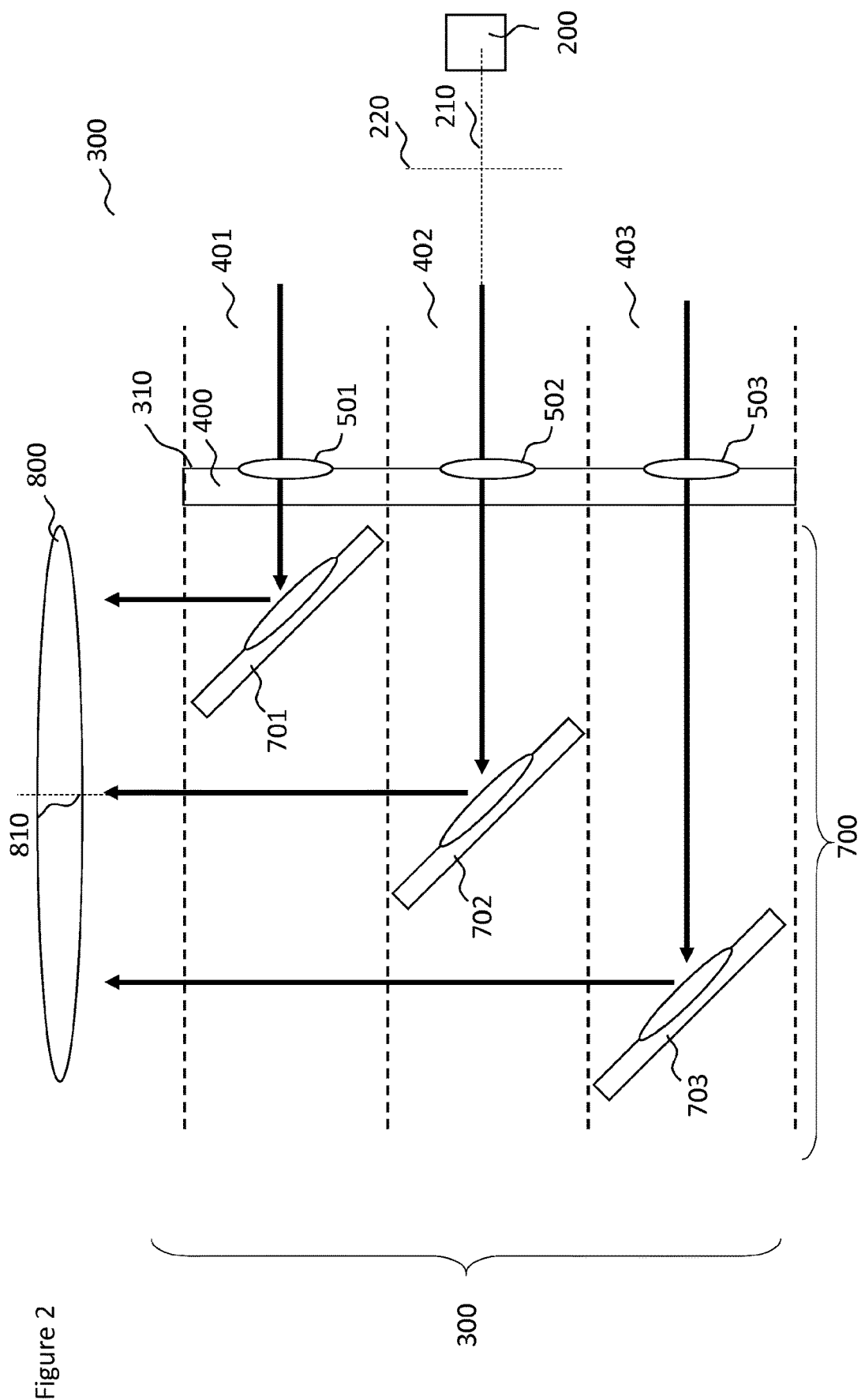
FIG. 2 shows an embodiment of an image realisation device for use in the apparatus of FIG. 1.

FIG. 2 shows an embodiment of an image realisation device 300 for use in the apparatus of FIG. 1.

In FIG. 2 there is shown the picture generation unit 200, image realisation device 300 and the projection optics 800 arranged such that the projection axis 210 and the optical axis 810 are perpendicular (i.e. the optical path bends by 90°), with the image realisation device 300 located at their intersection (i.e. the bend in the optical path).

The image realisation device 300 is formed from a mirror array 700 and an image realisation surface 310 which in the illustrated embodiment is a planar optical diffuser 400. The optical diffuser 400 and the mirror array both lie on the projection axis 210, with the optical diffuser located between the mirror array 700 and the picture generation unit 200.

The optical diffuser 400 is arranged perpendicular to the projection axis 210. The optical diffuser 400 is nominally divided into three regions 401, 402 and 403 along the lateral axis 220, though the skilled person would understand that the optical diffuser 400 may be formed from any plurality of regions. As described below the number of regions determines the ability to present the virtual image on the HUD at a number of discrete perceived depths. Accordingly, in embodiments where a larger number of depths are required the number of regions increases accordingly.

The mirror array 700 is formed by three parallel mirrors 701-703 angled at 45° to both the first 210 and second 810 projection axis, such that light travelling along the projection axis 210 is reflected along the optical axis 810. Accordingly, depending exactly on the desired optical path, the mirrors 701-703 may be at any angle required to redirect light towards the projection optics 800. Equally, any suitable reflector or partial reflector may be employed providing there is a plurality of surfaces arranged to direct light from the different regions of the optical diffuser towards the projection optics 800.

The mirrors 701-703 are spaced apart along the optical axis such that each mirror 701-703 is directly opposite one region 401-403 of the optical diffuser and light from each region is reflected by one mirror 701-703. The mirrors 701-703 are spaced apart along the projection axis 210 so as to not block light from each other. Again, the ratio of mirrors to regions, as well as their exact relative orientations and positioning is not limited to the illustrated embodiment, but rather any arrangement that allows for images formed across the surface of the optical diffuser to be redirected towards the projection optics 800 and ultimately displayed on the screen 900 of the head-up display.

The picture generation unit 200 is formed of a light source and a spatial light modulator, though the skilled person would appreciate that any suitable imaging means may be used provided they were capable of forming one or more images on the optical diffuser 400. Accordingly, in an embodiment the picture generation unit 200 is a holographic unit which produces computer generated holograms for forming on the image realisation surfaces. In an alternative embodiment, the picture generation unit 200 is a light field unit to produce 3-dimentional light field images for forming on the image realisation surfaces.

In an embodiment, the picture generation unit 200 further includes imaging optics for manipulating the real images 501-503 onto the relevant region of the image realisation device 300.

In an embodiment, the picture generation unit 200 further includes imaging optics for manipulating the real images 501-503 onto the relevant region of the image realisation device 300.

The projection optics 800 are formed of a Fresnel lens, though any suitable focussing optics may be employed.

In use, real images 501-503 are formed on optical diffuser regions 401-403 respectively, before being reflected by mirrors 701-703 along the optical axis 810 towards the projection optics 800 and appearing on the screen 900 of the head-up display as series of virtual images. The arrangement of the optical diffuser regions 401-403 and mirrors 701-703 results in the real images 501-503 being formed at different distances from the focal point of the projection optics, causing the virtual images 1001-1003 visible on the screen 900 of the head-up display to have different foci, or apparent depths.

Accordingly, the apparatus, due to the arrangement of the optical diffuser regions allows for virtual images to be generated at the HUD at a desired depth by forming the image at different diffuser regions.

Figure 3:
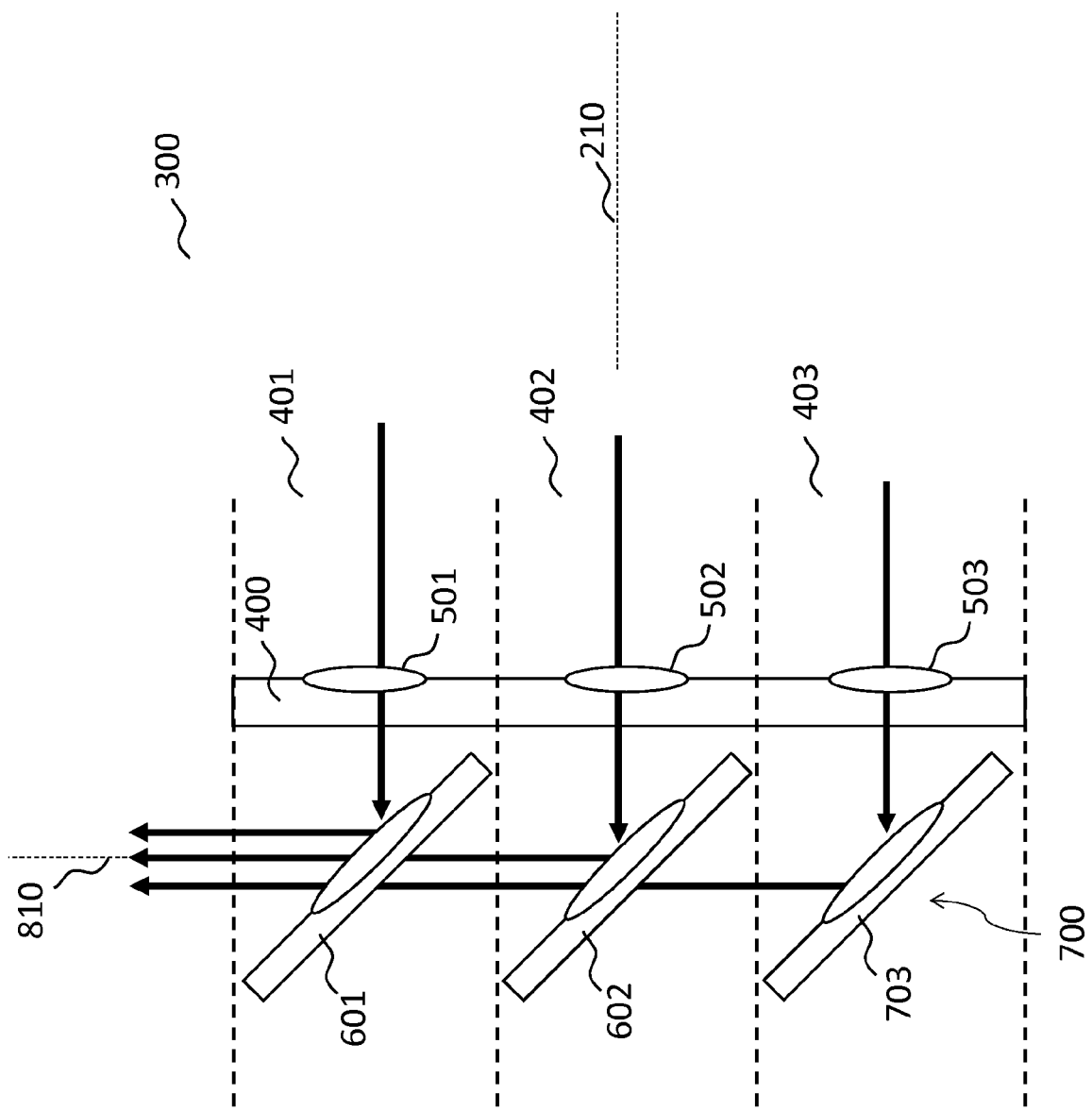
FIG. 3 shows a further embodiment of an image realisation device for use in the apparatus of FIG. 1.

FIG. 3 shows an embodiment in which the mirror 703 farthest along the projection axis 210 from the projection optics 800 is maintained, whilst the remaining mirrors 701 and 702 are replaced with beam splitters 601 and 602. Equally, the skilled person would understand that mirror 703 may also be replaced by beam splitter 603.

In this embodiment, the mirror 703 and beam splitters 601-602 are aligned along the optical axis 810, i.e. the same distance along the projection axis 210 whilst maintaining their relative positioning opposite to the regions 401-403 of the optical diffuser 400. Accordingly, images relayed by the mirror 703 and beam splitters 601-602 will be overlaid on the same area of the screen 900 of the head-up display, increasing the information density of the display, reducing the physical space occupied by the image realisation device 300 and the imaging system 100 as a whole.

In use, light reflected from mirror 703 is able to pass through beam splitters 601-602 on its way to the projection optics 800. Equally, light reflected from beam splitter 602 between the mirror 703 and beam splitter 601 is able to pass through beam splitter 601.

The resulting virtual images 1001-1003 are overlaid on the same area of the screen 900 of the head-up display whilst having different apparent depths.

In an embodiment, beam splitter 602 has a reflection/transmission ratio of 50/50 and beam splitter 601 has a reflection/transmission ratio of 30/70 or 33.33/66.67 which ensures each real image 501-503 projected through the projection optics have approximately the same brightness. In further embodiments other reflection/transmission ratios are used.

In an alternative embodiment the image realisation surface 310 is an image generation layer 350 rather than an optical diffuser 400. In an embodiment, the image generation layer 350 is an electroluminescent OLED, though any suitable image generation means may be employed. This allows for operation without the picture generation unit 200, reducing the overall size and component number of the imaging system 100.

The image generation layer 350 is arranged relative to the projection optics 800 in the same manner as the optical diffuser of the earlier embodiments.

Rather than forming images projected by the picture generation unit 200, the image generation layer 350 generates real images 501-503 by itself, which are then projected through the projection optics.

Figure 4A:
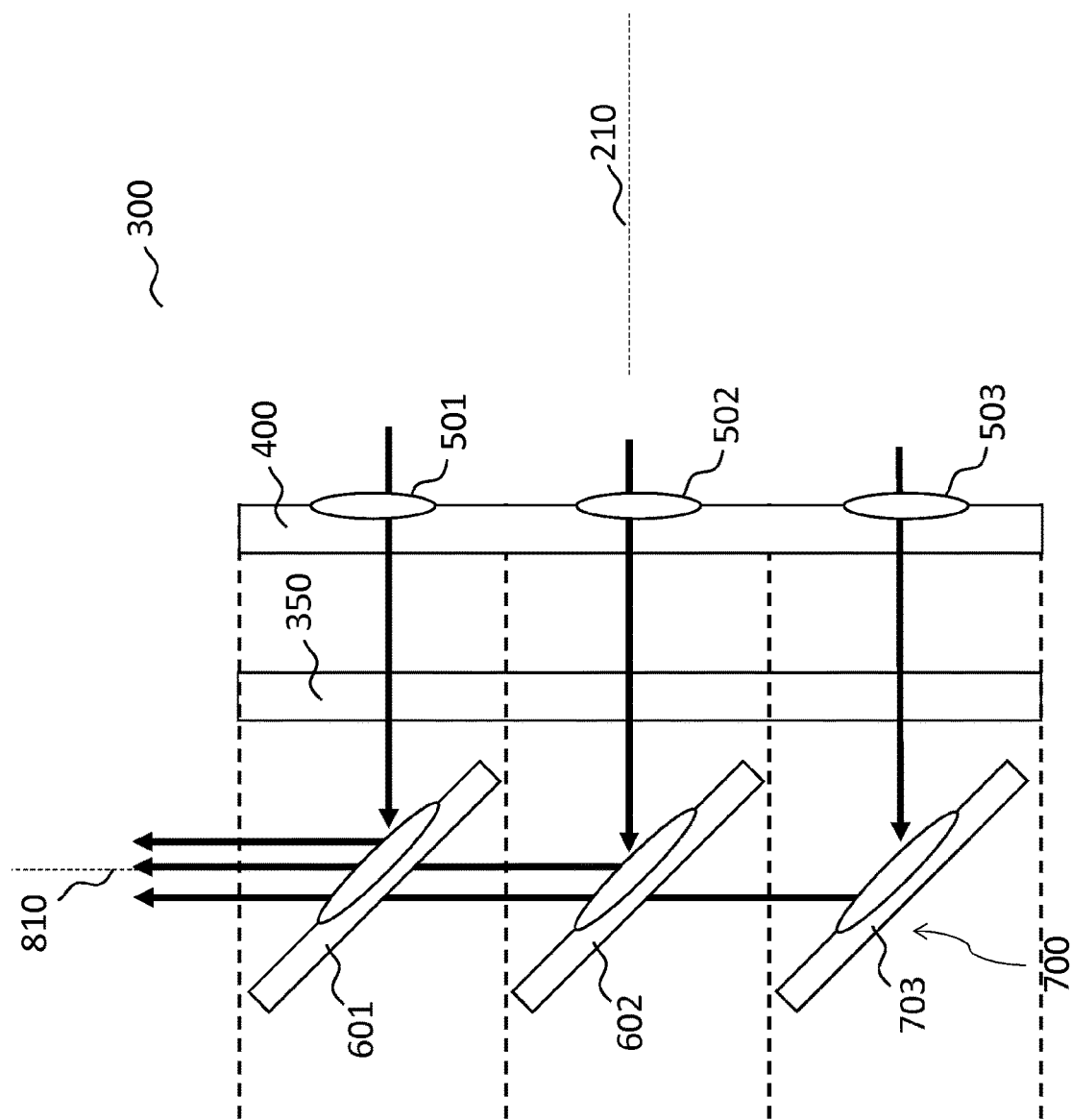
FIGS. 4A and 4B show further embodiments of an image realisation device for use in the apparatus of FIG. 1.
Figure 4B:
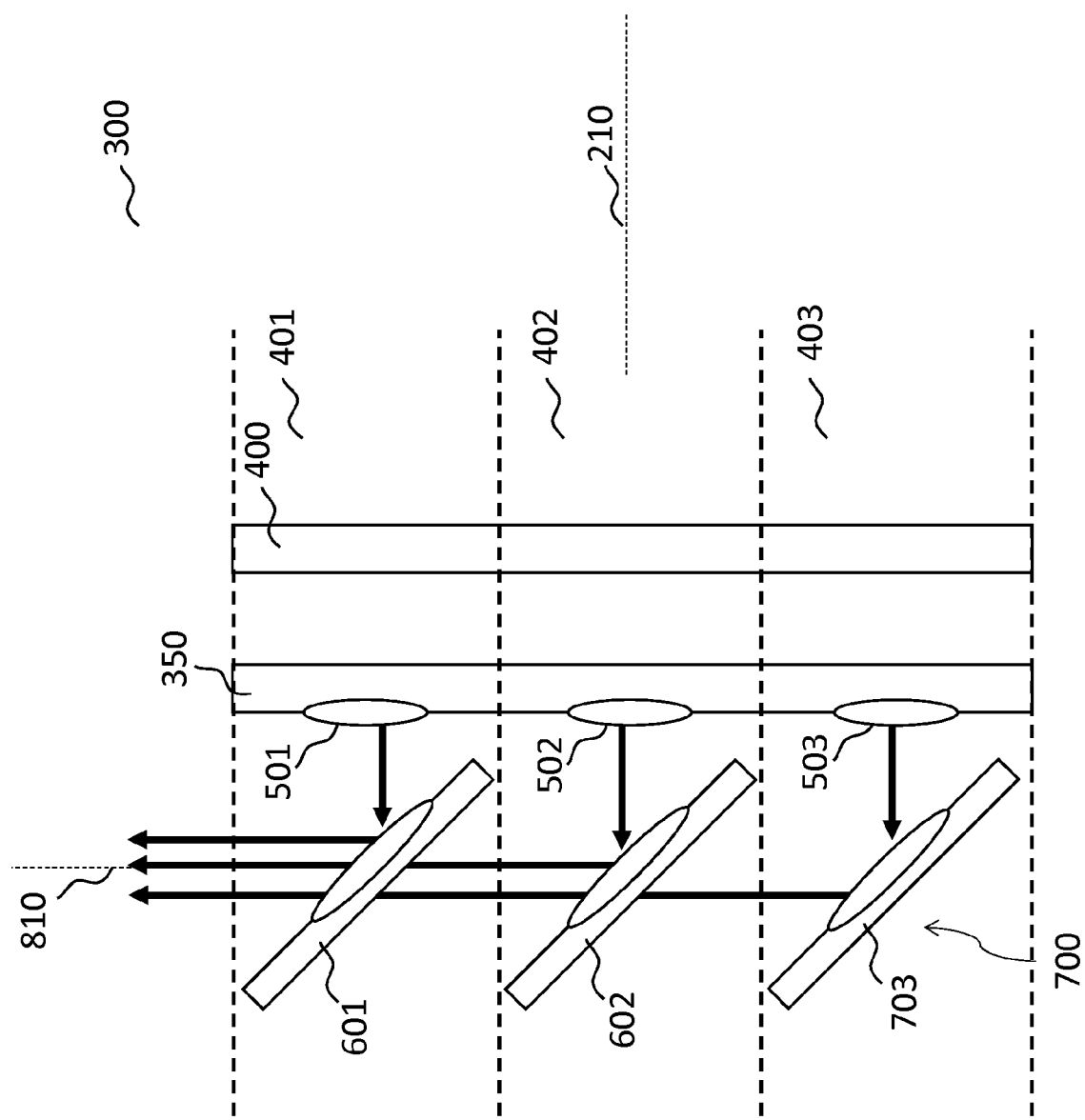

In a further embodiment depicted in FIGS. 4A and 4B, the image realisation device 300 is formed of both the optical diffuser 400 and the image generation layer 350, with the image generation layer 350 positioned along the optical path and the projection axis 210 between the optical diffuser 400 and the mirror array 700. The mirror array 700 may comprise beam splitters as described with regard to FIG. 3.

This provides for a system with two modes of operation, wherein each mode may be adapted to operate in different range of ambient light conditions. Further, the overlaying of the optical diffuser 400 and image generation layer 350 is this way allows for a dual mode system without requiring a second set of projection optics 800.

In use, when the picture generation unit 200 is being employed to form images on the optical diffuser 400 (as shown in FIG. 4A), the image generation layer 350 is in a transparent, deactivated or passive state, thereby allowing the real images 501-503 generated by the picture generation unit 200 to pass through to the projection optics 810.

Alternatively, when the image generation layer 350 is used to generate the real images 501-503 (as shown in FIG. 4B), both the picture generation unit 200 and the optical diffuser are in a deactivated/idle state to save power.

In an alternative embodiment, the image generation layer 350 is positioned along the projection axis 210 between the optical diffuser 400 and the picture generation unit 200. In this embodiment, the image generation layer 350 is once again in a transparent state when the optical diffuser 400 and picture generation unit 200 are in use.

In the other mode of operation, the image generation layer 350 is used to generate the real images 501-503 and the optical diffuser 400 transitions to a transparent state so as to allow the real images 501-503 pass to the mirror array 700 without interference.

Figure 5A:
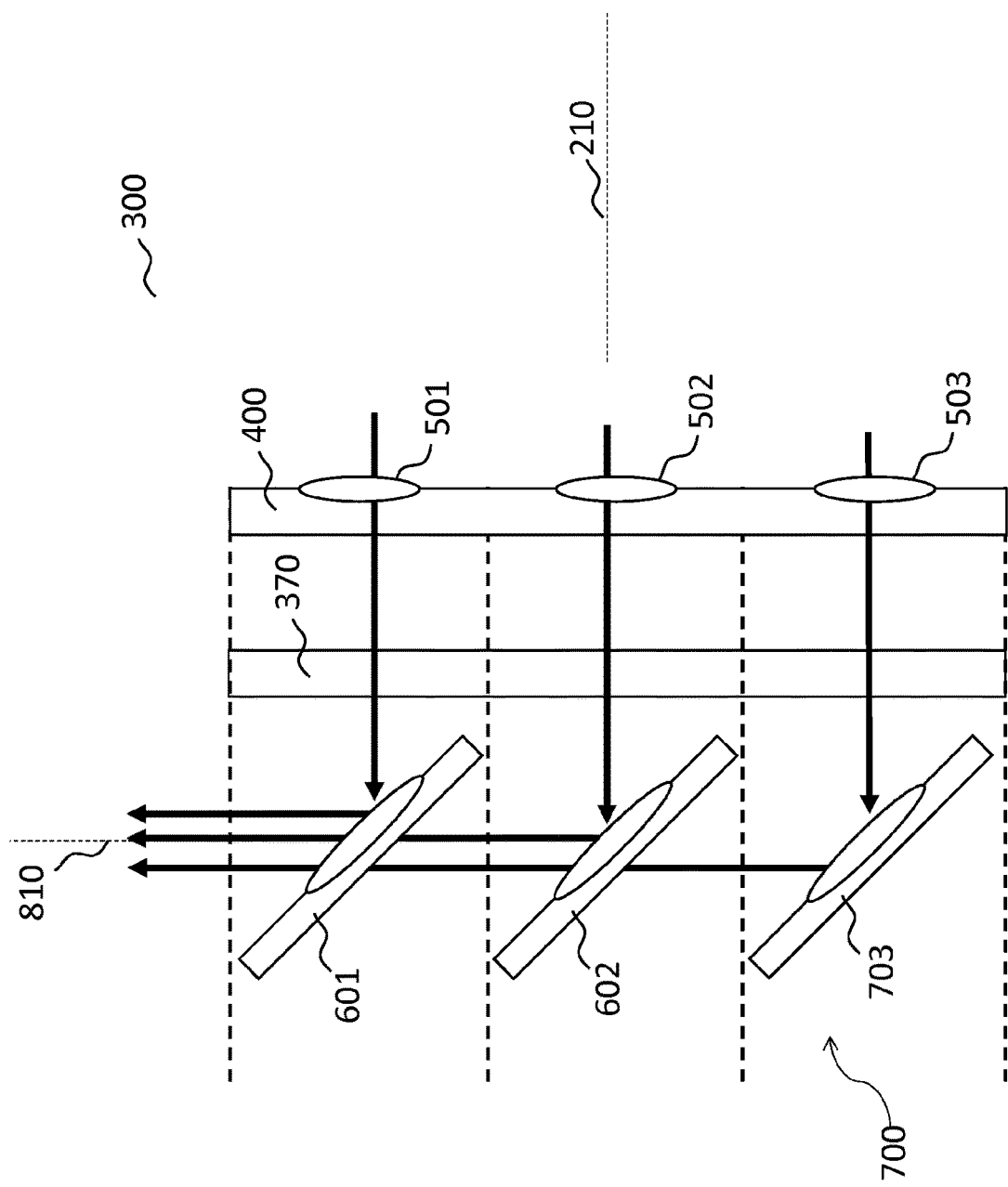
FIG. 5 shows a further embodiment of an image realisation device for use in the apparatus of FIG. 1.
Figure 5B:
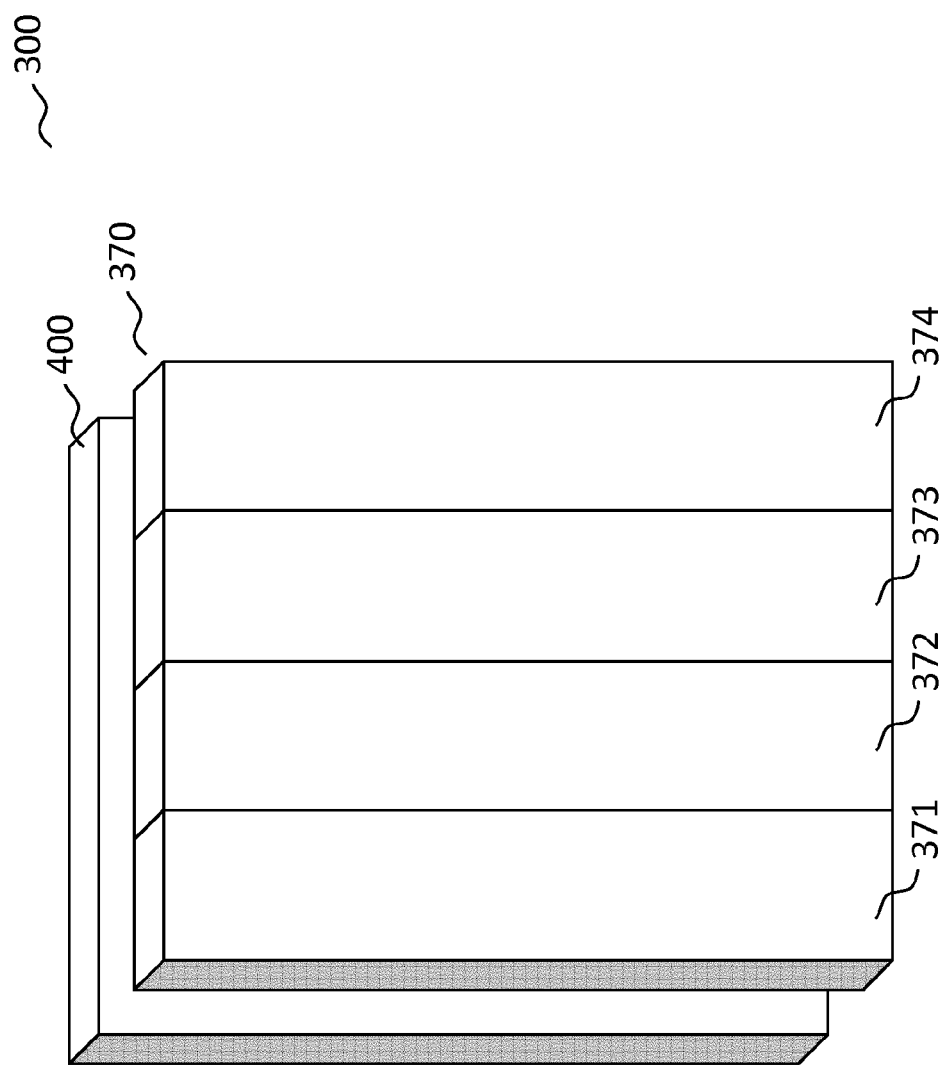

FIGS. 5A and 5B show an embodiment in which an actively controlled optical component array of liquid crystal lenses 370 are located between the optical diffuser 400 and the mirror array 700. The mirror array 700 may comprise beam splitters as described with regard to FIG. 3.

The liquid crystal lens array 370 is a set of actively controlled optical components located between the image realisation surface and the plurality of surfaces, and has a plurality of regions 371-374. The focal length of each region 371-374 can be varied independently, increasing the range of apparent depths of virtual images 1001-1003 projected on to the screen 900 of the head-up display without significantly increasing the size of the imaging system.

In an embodiment, the picture generation unit 200 projects images on to the optical diffuser 400 in the form of interzigged stereo pairs. Each region 371-374 of the liquid crystal lens array 370 focusses a vertical line pair at a certain distance. The distance between the line pairs determines the focussing (or converging) distance. This provides for an apparent horizontal parallax in the virtual images 1001-1003 on the screen 900 of the head-up display.

Figure 6:
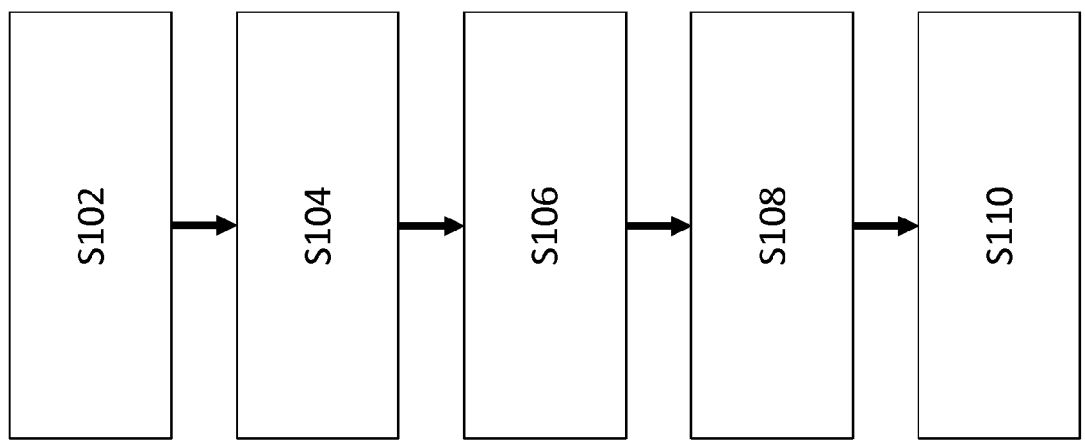
FIG. 6 shows a flow chart of the process for generating the image to be rendered on the screen of the head-up display.

FIG. 6 is a flow chart of the process for generating the image to be rendered on the screen 900 of the head-up display.

In an aspect of the invention the apparatus generates a virtual image which is displayed on the HUD, the HUD being a windscreen of the vehicle. As is known the windscreen of a vehicle is a geometrically distorted shape i.e. it is not flat. Accordingly, an image that is projected onto the windscreen will be distorted, the level of distortion being affected by various factors such as the shape of the windscreen, and the average distance of the windscreen from the projected image.

The apparatus described herein is able to generate an image which can be presented at various depths. Whilst the generation of the images at multiple depths on the HUD provides many advantages over a flat, single depth, image the ability to correct for factors such as the curvature of the windscreen results in further improvements in terms of depth control and image manipulation.

Advantageously in order to reduce the effect of the distortion in an aspect of the invention the windscreen distortion is corrected for by the image generation unit using software to pre-distort the image such that the image rendered on the windscreen is free from any distortions created by the windscreen. Such a software based correction eliminates the need for bulky correction optics and furthermore provides a higher degree of flexibility which can adapt to different windscreens.

The images to be presented on the HUD are generated by a picture generation unit. The picture generation unit defines the image to be displayed by the HUD. By way of example the image may comprise information regarding the car conditions and further information relating to navigation.

The term picture generation unit refers to the apparatus which determines and generates the base image to be rendered on the HUD. The process described herein is applicable to any suitable form of picture generation apparatus.

The picture generation unit comprises an image source which generates the image to be displayed on the HUD. The image source in an embodiment is a light engine, or OLED display or any suitable source which generates the image to be displayed. The image source comprises a software driver configured to determine and generate the image on the image source.

The software driver comprises a component which determines the content to be displayed. The process of the generation of content is known and in an aspect is performed using known means.

The driver further comprises a distortion module, the distortion module configured to apply a distortion to the generated image, the distortion calculated such that when the image is displayed on the HUD/windscreen the image appears undistorted to the end user.

At step S102 the windscreen is modelled as a mirrored surface. At step S102 the shape and gradient of the windscreen is determined. In an embodiment, as the shape of the windscreen is typically constant for a particular make and model of a vehicle it is pre-programmed.

At step S104 the image to be displayed on the HUD is taken as reference input image. Such an image will typically change several times per second.

At step S106 the input image is separated for each colour channel of the image to create an image per colour channel.

At step S108 for each colour channel image, for each pixel of the image the position of the pixel as visualised by a viewer located at a distance away from the windscreen surface is determined. This is determined by using ray reflection in order to determine the position of the pixel based on the average distance of the input pixel (as per step S106) the reflection surface of the windscreen (as per step S102) and the average distance between the rendered image and the windscreen, the image depth.

Therefore, at step S108 the level of distortion for each colour channel image, as a result of the windscreen and the physical distances, is calculated. This results in a distorted image (with the level of distortion being dependent on the physical parameters) for each colour channel. This can be achieved by monitoring the displacements of certain predefined points on a distorted image and fitting them to obtain the related distortion parameters.

At step S110 the individual distorted colour channel images are combined. The combined image is the resultant pre-distortion image as the projection of the pre-distortion image will result in the input image (as per step S104) being displayed.

As such the process provides an improved methodology for ensuring that the generated image is free from distortion.

Figure 7:
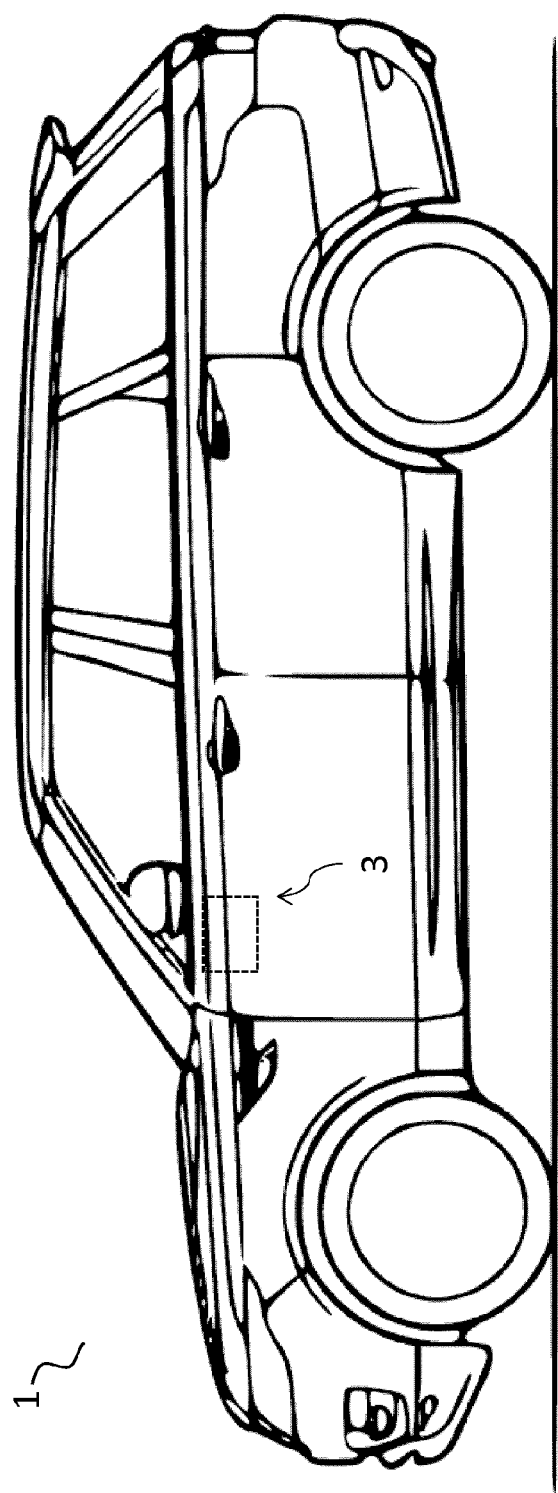
FIG. 7 is a vehicle according to an embodiment of the invention.

FIG. 7 illustrates a vehicle 1 comprising the apparatus 3 of FIGS. 1 to 5. The apparatus 3 may be embodied in an imaging system.

The invention claimed is:

1. An imaging system for generating multi-depth virtual images on a display screen, the imaging system comprising:
   an image realisation device for forming a source image; and
   projection optics for rendering a display image on the display screen, wherein the display image is a virtual image corresponding to the source image, and
   wherein the image realisation device comprises:
      an image realisation surface having a first and second region, wherein the image realisation surface and the projection optics are arranged such that a first point in the first region of the image realisation surface and a second point in the second region of the image realisation surface are at a different distance from a focal point of the projection optics; and
      a plurality of surfaces arranged to direct light from the image realisation surface towards the projection optics,
      wherein the surfaces and image realisation surface are arranged such that a first source image formed on the first region of the image realisation surface and projected through the projection optics will render the first display image on the display screen at a first apparent depth and a second source image formed on the second region of the image realisation surface and projected through the projection optics will render the second display image on the display screen at a second apparent depth; and
      wherein two or more of the plurality of surfaces are beam splitters having reflection/transmission ratios, wherein each beam splitter has a different reflection/transmission ratio, and wherein the reflection/transmission ratios are such that the brightness of the first and second display image is approximately equal.

2. The imaging system according to claim 1, wherein each region of the image realisation surface is associated with one of the plurality of surfaces.

3. The imaging system according to claim 1, wherein the image realisation surface is translatable along an optical axis of the projection optics and/or rotatable and/or tiltable relative to an optical axis of the projection optics.

4. The imaging system according to claim 1, wherein the image realisation surface is capable of generating the source image.

5. The imaging system according to claim 1, further comprising a picture generation unit for generating the source image to be rendered as the display image on the display screen and projecting the source image onto the image realisation surface.

6. The imaging system according to claim 5, wherein the image realisation surface is an optical diffuser.

7. The imaging system according to claim 1, wherein the plurality of surfaces comprise a mirror and a first and second beam splitter, wherein the reflection/transmission ratio of the first beam splitter is 50/50 and the reflection/transmission ratio of the second beam splitter is 30/70.

8. The imaging system according to claim 1, wherein the plurality of surfaces are aligned along an optical axis of the projection optics and the virtual images are overlaid on the display screen.

9. The imaging system according to claim 6, wherein the system comprises a second image realisation surface having a first image generating state and a second passive state.

10. The imaging system according to claim 9, wherein the second image realisation surface is arranged between the optical diffuser and the plurality of surfaces.

11. The imaging system according to claim 9, wherein the second image realisation surface is arranged between the picture generating unit and the optical diffuser and wherein the optical diffuser has a first image forming state and a second passive state.

12. The imaging system according to claim 9, wherein the imaging system is configured such that when the imaging system is exposed to ambient light having an intensity below a predetermined threshold the second image realisation surface is placed in the first state and the optical diffuser is placed in the second passive state.

13. The imaging system according to claim 1, further comprising a set of actively controlled optical components located between the image realisation surface and the plurality of surfaces, wherein the focal length of each optical component is controlled to affect the focus of a portion of the source image formed on the image realisation surface, so as to provide an additional range of depth of the display images projected by the projection optics.

14. The imaging system according to claim 5, wherein the picture generation unit, image realisation device and projection optics are arranged along an optical path of the imaging system.

15. The imaging system according to claim 5, wherein the picture generation unit comprises a holographic unit to produce computer generated holograms for forming on the diffuser.

16. The imaging system according to claim 5, wherein the picture generation unit comprises a light field unit to produce 3-dimentional light field images for forming on the image realisation surface.

17. The imaging system according to claim 1, further comprising an ambient light sensor configured to adjust the brightness of the displayed virtual images.

18. The imaging system according to claim 1, wherein the display screen is a screen of a head-up display.

19. A vehicle comprising the imaging system of claim 1.

20. A method for generating multi-depth virtual images on a display screen, the method comprising the steps of:
   rendering a display image on the display screen, via a projection optics wherein the display image is a virtual image corresponding to a source image, and wherein the image realisation device comprises:
      an image realisation surface having a first and second region, wherein the image realisation surface and the projection optics are arranged such that a first point in the first region of the image realisation surface and a second point in the second region of the image realisation surface are at a different distance from a focal point of the projection optics; and
      a plurality of surfaces arranged to direct light from the image realisation surface towards the projection optics,
      wherein the surfaces and image realisation surface are arranged such that a first source image formed on the first region of the image realisation surface and projected through the projection optics will render the first display image on the display screen at a first apparent depth and a second source image formed on the second region of the image realisation surface and projected through the projection optics will render the second display image on the display screen at a second apparent depth, wherein two or more of the plurality of surfaces are beam splitters having reflection/transmission ratios, wherein each beam splitter has a different reflection/transmission ratio, and wherein the reflection/transmission ratios are such that the brightness of the first and second display image is approximately equal.

\* \* \* \* \*